United States Patent [19]

Sato et al.

[11] Patent Number: 4,896,921
[45] Date of Patent: Jan. 30, 1990

[54] WHEEL FOR VEHICLE

[75] Inventors: Chiharu Sato, Utsunomiya; Yoichi Kamiyama, Kawachimachi; Hiroyuki Ikegami, Utsunomiya, all of Japan

[73] Assignee: Honda Giken Kogyo Kabushiki Kaisha, Tokyo, Japan

[21] Appl. No.: 239,229

[22] Filed: Sep. 1, 1988

[30] Foreign Application Priority Data

Sep. 4, 1987 [JP] Japan ............................ 62-134498[U]

[51] Int. Cl.⁴ ............................................. B60C 23/18
[52] U.S. Cl. ..................................... 301/5 R; 301/95; 152/381.5; 152/418; 152/153
[58] Field of Search ............... 301/5 R, 6 WB, 95–99; 152/381.3, 381.5, 381.6, 521, 418, 153

[56] References Cited

U.S. PATENT DOCUMENTS

| | | | |
|---|---|---|---|
| 1,693,909 | 12/1928 | Michelin | 152/381.5 |
| 2,074,284 | 3/1937 | Stevenson | 152/153 X |
| 3,414,036 | 12/1968 | Skidmore | 152/153 |
| 3,933,392 | 1/1976 | Wells | 301/97 X |
| 3,999,587 | 12/1976 | Mitchell | 152/381.5 X |
| 4,177,849 | 12/1979 | Osada et al. | 152/521 X |
| 4,289,187 | 9/1981 | Rivin | 152/418 |
| 4,782,877 | 11/1988 | Frerichs et al. | 152/520 X |

FOREIGN PATENT DOCUMENTS 58-47606  3/1983  Japan .
58-22364  5/1983  Japan .
61-146603  7/1986  Japan .

Primary Examiner—Russell D. Stormer
Attorney, Agent, or Firm—Armstrong, Nikaido, Marmelstein, Kubovcik & Murray

[57] ABSTRACT

The wheel of the present invention reduces road noise without using a special tire. The wheel includes a wheel body and a silencing chamber formed around the wheel body. The silencing chamber communicates with an air chamber in the tire via communication port. The phase difference between a compressional wave in the air chamber and a compressional wave returned to the air chamber from the communication port cause attenuation of the road noise.

3 Claims, 4 Drawing Sheets

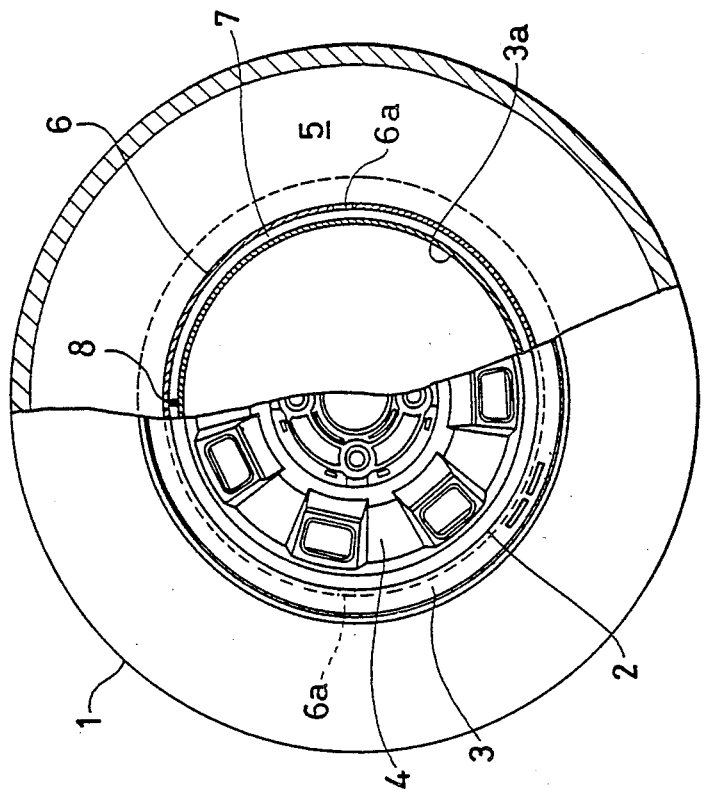
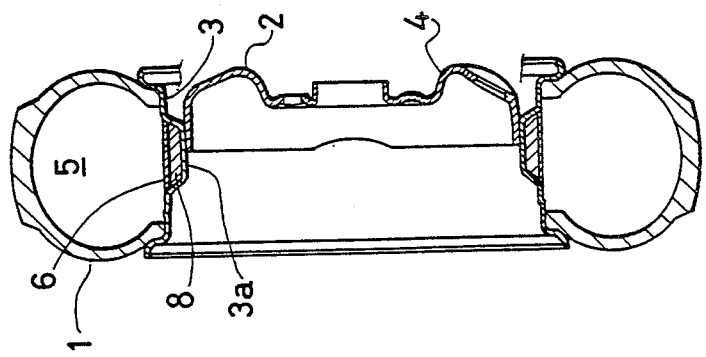

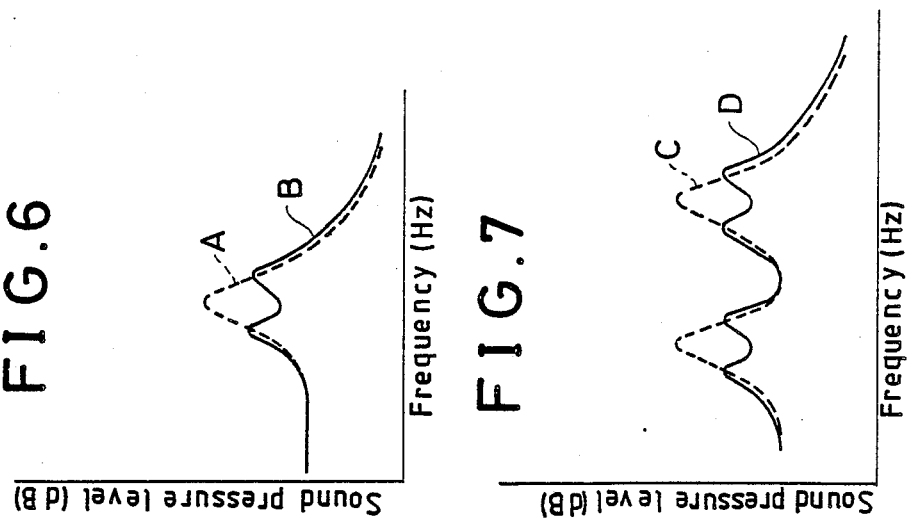
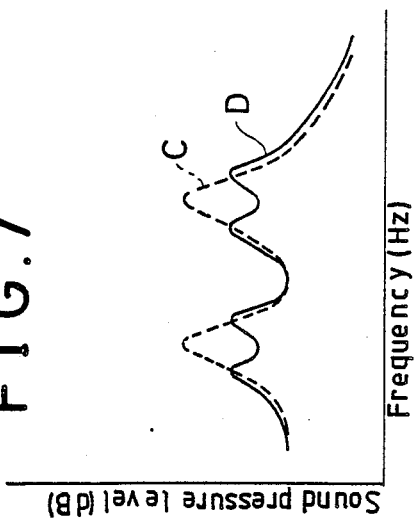
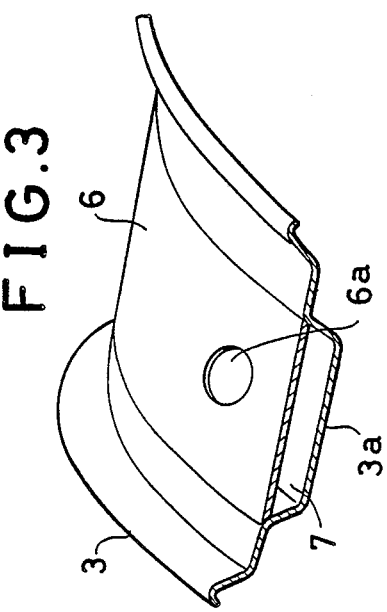
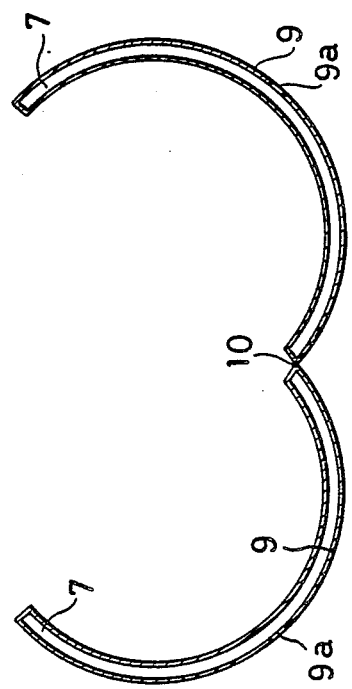

WHEEL FOR VEHICLE

FIELD OF THE INVENTION

The present invention relates to a wheel for vehicles, which is designed to minimize wheel noise.

BACKGROUND OF THE INVENTION

As disclosed in Japanese Patent Publication No. 22364/1983, a wheel for vehicles has a specific tread pattern specially designed to minimize the road noise of the tire. As disclosed in Japanese Patent Laid-Open Nos. 47606/1983 and 146603/1986, tires can be provided with members having specific values of physical properties to minimize noise. The members are included in the carcass layers and belt layers in the tire rubber.

The modifications of the tread pattern and of the construction of the carcass and belt layers made in the above described conventional wheels, adversely affect the steering stability and the ride of the vehicle, which are the essential performances required of a tire. Thus, it was possible, only to a very limited extent, to reduce the road noise of a tire through these measures without sacrificing performance of the tire.

One of the causes of road noise of a tire is due to the vibrations of the tread. The vibrations occur as the portion of the tire in contact with the road surface is turned to regain its original expanded state. The air in the air chamber resonates to generate a compressional wave having a specific frequency and a large amplitude.

SUMMARY OF THE INVENTION

An object of the present invention is to provide a wheel for vehicles which takes advantage of the fact that resonance suppression in the air chamber is an effective means for suppressing a noise from a compressional wave. The wheel is designed to be capable of reducing road noise without using a special tire.

To achieve this object, the present invention provides a wheel having a tubeless tire. The wheel comprises a wheel body, and a silencing chamber. The silencing chamber is formed around the wheel body and communicates with an air chamber in the tire via a communication port.

BRIEF DESCRIPTION OF THE DRAWINGS

FIG. 3 is an enlarged perspective view of an adjoining region of a communication port;

FIG. 4 is a sectional front elevation of another embodiment of this invention;

FIG. 5 is a partially sectioned side elevation of the second embodiment;

FIGS. 6 and 7 are frequency characteristic curves obtained from the embodiments;

FIG. 10 is a sectioned side elevation of a hollow member.

DESCRIPTION OF THE PREFERRED EMBODIMENTS

The road noise, from a compressional wave generated by resonance propagating from the tread of a tire to the air chamber, is reduced by the resonance-suppression effect of the silencing chamber provided in the wheel. Namely, a part of the compressional waves, occurring in the air chamber, enters the silencing chamber via the communication port. The compressional wave is reflected off the inner surface of the silencing chamber and returns to the interior of the air chamber through the communication port. During this time, a phase difference occurs between the compressional waves in the air chamber and the compressional waves reflected and returned to the interior of the air chamber. These two compressional waves interfere with each other and are attenuated.

A frequency (fo) which provides the silencing effect is expressed by the equation:

$$fo = \frac{C}{2\pi} \sqrt{\frac{S}{Vl}} \tag{1}$$

(wherein C is a sonic velocity, S the cross-sectional area of the communication port, V the capacity of the silencing chamber, and l the length of the communication port). If the dimensions of the communication port and silencing chamber are set in accordance with the frequency characteristics of the road noise of the tire to be installed, the road noise can be effectively reduced.

Figure 2:
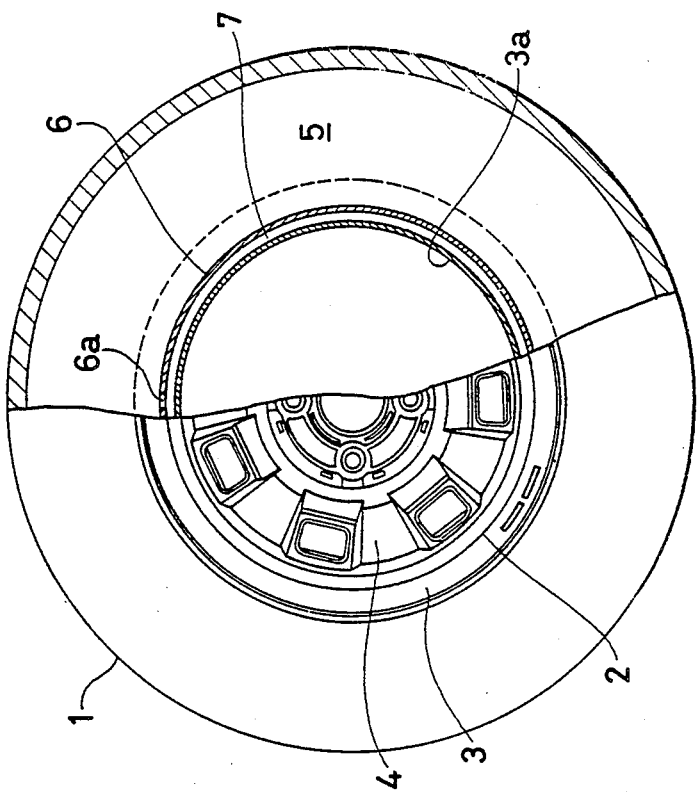
FIG. 2 is a partially sectioned side elevation of the first embodiment.
Figure 1:
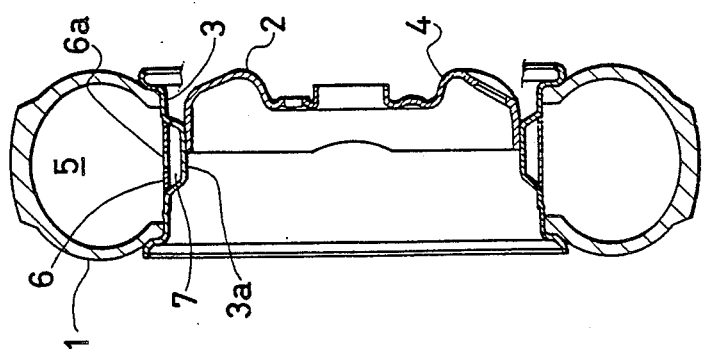
FIG. 1 is a sectional front elevation of a first embodiment of this invention.
Figure 9:
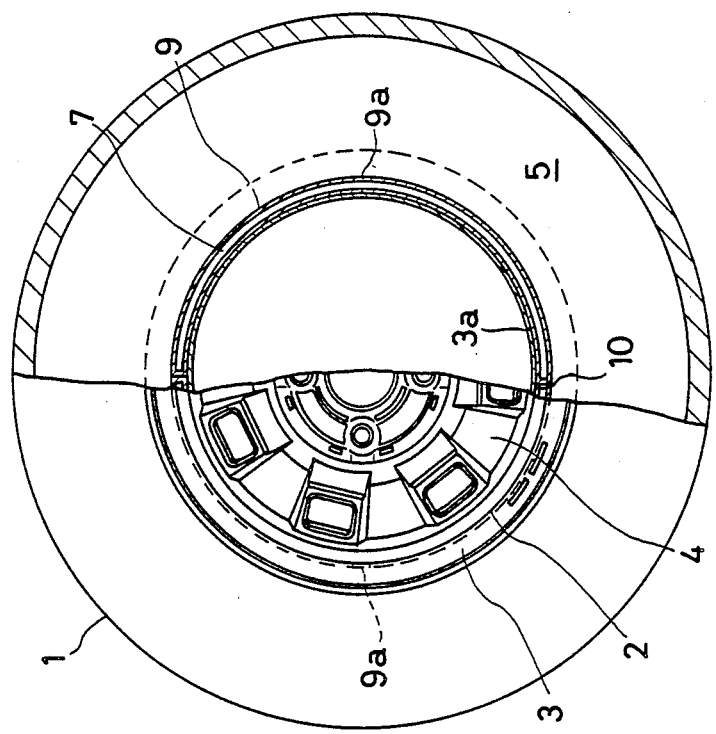
FIG. 9 is a partially sectioned side elevation of the third embodiment.
Figure 8:
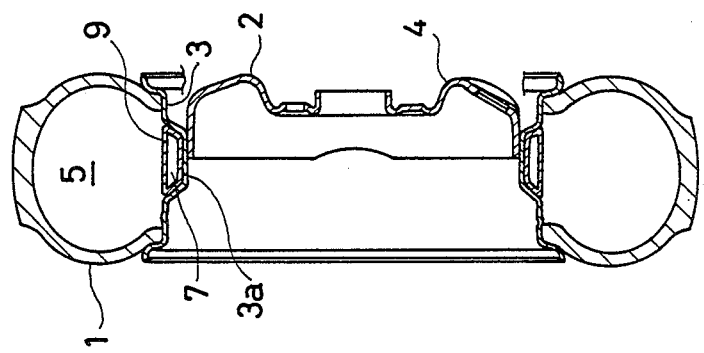
FIG. 8 is a sectional front elevation of still another embodiment in which the silencing chamber consists of a hollow member.

Referring to FIGS. 1-3, reference numeral 1 denotes a tubeless tire. A wheel body 2 consists of a rim 3 and a hub 4. An air chamber 5 is formed between the rim 3 and the tubeless tire 1.

The rim 3 is provided with a recess 3a extending over the whole circumference of the rim. An annular partition 6 is provided to separate the interior of the recess 3a from the air chamber 5 and to make the hollow space in the recess 3a a silencing chamber 7. The partition 6 is provided at a suitable portion of the rim with a communication port 6a, through which the silencing chamber 7 and the air chamber 5 communicate with each other.

Two or more silencing chambers 7 may also be formed. FIGS. 4 and 5 show another embodiment of the present invention in which two silencing chambers 7 are provided. In this embodiment, a pair of partitions 8, 8 are disposed diametrically and symmetrically in an annular silencing chamber unit to divide the chamber unit into two chambers 7. Both chambers 7 are provided respectively with communication ports 6a, 6a.

According to the above-described arrangement, if the capacity V of the silencing chamber 7 and the cross-sectional area S of the communication port 6a are set so that the silencing frequency (fo), expressed by equation (1), agrees with the resonance frequency of the air in the air chamber 5, a noise level in the resonance frequency zone is decreased. This is indicated by a curve B in FIG. 6 for this embodiment, showing the silencing effect which is obtained. In contrast, curve A, shown in FIG. 6, is the frequency characteristic of the road noise of a wheel which is not made according to this embodiment.

According to another embodiment which has a plurality of silencing chambers 7 (for example, two silencing chambers 7), when two resonance frequencies exist, as shown by a curve C in FIG. 7, the cross-sectional areas of the two communication ports 6a, 6a are set to be different from each other so that these cross-sectional areas may be compatible with respective resonance frequencies. As a result, the silencing effect shown by a curve D in FIG. 7 can be obtained. In this embodiment, the locations of the partitions 8, 8 may be changed so that the capacities of the two silencing chambers 7, 7 can be changed to correspond to the relative resonance frequencies.

In these embodiments, it is necessary that the partition 6 be hermetically fixed over the entire circumference of the rim. In order to meet this requirement, an annular hollow member 9 comprises semi-annular parts joined together via a hinge 10 so as to permit the annular member 9 to swing open and close at the hinge 10. The member 9 is fitted around the rim 3, and the interior of the hollow member 9 is thus formed as the silencing chambers 7, 7. The communication ports 9a, 9a are formed in the hollow member 9. Thus, the silencing chambers 7 can be formed simply. The hollow member 9 used in this embodiment may be substituted by a C-shaped member, in which case the C-shaped member may be fitted to the rim 3 by bonding it thereto with the open side of the former facing the latter.

According to the invention as described above, the wheel for vehicles can reduce the road noise of a tire without sacrificing the performance thereof. The wheel can be produced inexpensively by applying a simple working fitted member to the wheel body of the wheel.

From the foregoing description of the preferred embodiment of the invention, it will be apparent that many modifications may be made therein. It should be understood that these embodiments are intended as one example of the invention only, and that the invention is not limited thereto. Therefore, it should be understood that the appended claims are intended to cover all modifications that fall within the true spirit and scope of the invention.

What is claimed is:

1. A wheel for vehicles, having a tubeless tire, said wheel comprising:
    a wheel body, a rim of said wheel body is provided therearound with an annular hollow member which comprises two semiannular hollow parts joined to each other via a hinge so that said hollow member can be opened and closed at said hinge; and
    a silencing chamber formed around said wheel body and communicating with an air chamber in said tire via a communication port, said silencing chamber being formed in said hollow member, said communication port being made in a wall of said hollow member.

2. A wheel for vehicles according to claim 1, wherein a plurality of said silencing chambers are provided.

3. A wheel for vehicles according to claim 1, wherein said annular hollow member is fitted in a recess formed to extend over an entire periphery of said rim.

* * * * *

UNITED STATES PATENT AND TRADEMARK OFFICE
CERTIFICATE OF CORRECTION

PATENT NO. : 4,896,921

DATED : January 30, 1990

INVENTOR(S) : SATO et al

It is certified that error appears in the above-identified patent and that said Letters Patent is hereby corrected as shown below:

On the cover page, Item [21], "239,229" should read --239,239--.

Signed and Sealed this

Thirtieth Day of April, 1991

*Attest:*

HARRY F. MANBECK, JR.

*Attesting Officer*　　　*Commissioner of Patents and Trademarks*